US 6,489,598 B1

(12) United States Patent
Hielm (10) Patent No.: US 6,489,598 B1
(45) Date of Patent: Dec. 3, 2002

(54) HEAT GENERATOR FOR A MOTOR VEHICLE USING INDUCTION HEATING (75) Inventor: Odd Hielm, Eldsberga (SE)

(73) Assignee: AB Konstuktions-Bakelit, Orkelljunga (SE)

( * ) Notice: Subject to any disclaimer, the term of this patent is extended or adjusted under 35 U.S.C. 154(b) by 0 days.

(21) Appl. No.: 10/009,267
(22) PCT Filed: Jun. 16, 2000
(86) PCT No.: PCT/SE00/01262
§ 371 (c)(1),
(2), (4) Date: Dec. 10, 2001
(87) PCT Pub. No.: WO00/78569
PCT Pub. Date: Dec. 28, 2000

(30) Foreign Application Priority Data

Jun. 18, 1999 (SE) ................................ 9902321

(51) Int. Cl.[7] .............................. H05B 6/10; F01P 3/20
(52) U.S. Cl. ...................... 219/631; 219/632; 219/670; 122/26; 126/247; 237/12.3 R
(58) Field of Search ................................ 219/630, 631, 219/628, 629, 672, 670, 635; 122/26; 126/247; 237/12.3 R, 12.3 A, 12.3 B (56) References Cited

U.S. PATENT DOCUMENTS

| 4,484,049 A | 11/1984 | Ahner et al. | 219/631 |
| 4,486,638 A | * 12/1984 | De Bennetot | 219/631 |
| 5,012,060 A | 4/1991 | Gerard et al. | 219/631 |
| 5,573,184 A | 11/1996 | Martin | 237/12.3 R |
| 5,914,065 A | * 6/1999 | Alavi | 219/631 |
| 6,144,020 A | * 11/2000 | Usui et al. | 219/631 |
| 6,297,484 B1 | * 10/2001 | Usui et al. | 219/631 |

FOREIGN PATENT DOCUMENTS

| EP | 0 087 727 A1 | 9/1983 |
| WO | WO 99/45748 | * 9/1999 |

* cited by examiner

Primary Examiner—Philip H. Leung
(74) Attorney, Agent, or Firm—Birch, Stewart, Kolasch & Birch, LLP (57) ABSTRACT A heat generator for reducing emissions includes a permanently magnetized, disc-shaped rotor; a stator axially separated from the rotor and in which the rotor induces electric currents as it rotates to generate heat in the stator; and an adjoining cooling duct through which a cooling liquid flows to dissipate heat generated in the stator. The rotor and stator are axially movable in relation to one another to adjust the heat generated in the stator. Heat output is controlled by a member acting axially on the rotor in the direction of the stator with a variable force against the action of a repelling force, and includes a soft magnetic material forming part of the stator. The permanently magnetized rotor and the stator are magnetically attracted to one another, and it is possible to strengthen/weaken their to achieve a predetermined output/speed profile.

17 Claims, 12 Drawing Sheets

HEAT GENERATOR FOR A MOTOR VEHICLE USING INDUCTION HEATING

This application is the national phase under 35 U.S.C. §371 of PCT International Application No. PCT/SE00/01262 which has an International filing date of Jun. 16, 2000, which designated the United States of America and was published in English.

The present invention relates generally to a heat generator for motor vehicles and primarily to one for reducing emissions from the internal combustion engine of a motor vehicle.

U.S. Pat. No. 4,484,049 discloses a water-cooled heat generator for the passenger compartment of a motor vehicle. The heat generator comprises a shaft driven by the vehicle engine, which shaft is common to the rotor in an electric generator and a rotor in the heat generator itself. Alternating current drawn from the stator winding of the electric generator is rectified and fed as magnetising current to the rotor in the heat generator. The latter also has a laminated stator with armature bars connected between two short-circuit rings, the bars like the short-circuit rings being hollow. The armature bars, in which the rotor of the heat generator generates induction currents as it rotates, are, like the short-circuit rings, cooled by water that circulates through them. The water thus heated is in turn used for heating the vehicle passenger compartment.

The said heat generator is bulky, complicated and also has poor efficiency.

U.S. Pat. No. 5,573,184 discloses a heat generator based on friction heating. This heat generator, too, is bulky owing to a high volume/output ratio, a relatively high-viscosity operating liquid moreover being required.

PCT/SE99/00283 describes a heat generator with a permanently magnetised, disc-shaped rotor, a stator, which is axially separated from the rotor and in which the rotor induces electric currents as it rotates, which generate heat in the stator, and adjoining the stator a cooling duct for a flowing liquid in order to dissipate the heat generated in the stator.

This heat generator is compact and provides very efficient heating of the cooling liquid, which is intended for use in heating the coolant in an internal combustion engine in an initial phase after starting the internal combustion engine.

Because of the highly efficient conversion from mechanical work, which drives the heat generator, to generated heat in the cooling liquid, it may be necessary in many applications to control the generated heat output according to a varying demand. This might obviously be done by corresponding variation of the mechanical power delivery, which drives the heat generator, by adjusting the speed of rotation of the rotor of the heat generator. Such a speed variation is not possible in all applications, however, since other requirements may be crucial for the magnitude of the mechanical power output, for example the power needed to propel a vehicle. In such a case the desired heat output can nevertheless be produced by connecting the heat generator intermittently in such a way that the mean value of the generated heat output corresponds to the desired heat output. This intermittent connection, however, presupposes a connecting arrangement, which requires space and may mean that the heat generator becomes complicated and/or undesirably expensive.

An object of the present invention is to provide a heat generator for motor vehicles, which is compact but still permits easy adjustment of the heat generated.

A heat generator according to the invention has a permanently magnetised, disc-shaped rotor; a stator, which is axially separated from the rotor and in which the rotor induces electric currents as it rotates, which generate heat in the stator; and adjoining the stator a cooling duct for a flowing cooling liquid in order to dissipate the heat generated in the stator. The rotor and the stator are furthermore axially moveable in relation to one another, in order to adjust the distance between them and thereby to adjust the heat generated in the stator or the heat output. This makes use of the fact that an adjustment of the distance between the rotor and the stator affects the magnitude of the currents. that the rotor induces in the stator and hence the magnitude of the heat generated by the said currents. Finally, means are arranged for determining the heat output generated in the stator by acting axially on the rotor in the direction of the stator with a variable force against the action of a repelling force, generated by the currents induced in the stator. The rotor can thereby be set to an axial position in relation to the stator depending on the heat output to be generated in the stator.

The stator preferably comprises two metallic layers, which define a narrow, substantially radial gap, which constitutes a part of the cooling duct designed for radial flow. In this way the distance over which the liquid in the cooling duct is heated is rendered relatively short, which is a pre-requisite for rapid heating utilising a high output.

In addition, the cooling duct suitably comprises two annular spaces, which adjoin the radial gap on that side thereof remote from the rotor and are designed for a circumferential flow of the cooling liquid. This design means that the cooling liquid follows intersecting paths on both sides of one of the two metallic layers, represented by the layer furthest from the rotor. Because of these intersecting flows of cooling liquid, such phenomena as evaporation and film boiling, which might otherwise occur as a result of the rapid heating and lead to cavitation and overheating, can be prevented.

The means for acting axially on the rotor in the direction of the stator, that is to say for adjusting the distance between the rotor and the stator depending, for example, on the desired heating of the flowing liquid, may be designed in many different ways, but they suitably comprise a soft magnetic material, which constitutes part of the stator, so that the magnetic field of the rotor is closed and a magnetic attraction force acts between the permanently magnetised rotor and the stator.

Of the two metallic layers, one nearest the rotor may comprise an electrically conductive, preferably non-magnetic material, and one furthest away from the rotor may comprise the soft magnetic material.

The force generated in the stator, which has a repelling action on the rotor, may be dimensioned so that at a predetermined speed of rotation it moves the rotor away from the stator against the action of the magnetic attraction force between the permanently magnetised rotor and the stator. This is achieved, for example, through the choice of stator magnetic material and through the choice of its volume and distance from the rotor.

The means for acting axially on the rotor may comprise spring means, pneumatic or hydraulic piston and cylinder units and/or electrically operated units. The said means may strengthen and/or weaken the magnetic attraction force or the repelling force in order to permit the achievement of a predetermined output/speed profile.

The means for acting axially on the rotor may furthermore comprise an override means for positively shifting the rotor to a desired output position or locking the rotor in a lower output position, for example when the entire output of the car engine is required for acceleration.

The means acting axially on the rotor may furthermore be controlled by an override signal from control electronics, which control the internal combustion engine, for limiting the heat output generated in the stator by positively shifting the rotor in relation to the stator, and achieving a position with limited output. Such an override signal might be generated by the control electronics in connection with acceleration, for example from stationary or in excess of a predetermined limit, the rotor being shifted to and locked in a lower output position.

By giving the means for applying force to the rotor in the direction of the stator a suitable force/distance profile, the heat output generated in the stator can thus take on a predetermined output/speed profile.

The currents that the rotor induces in the stator increase normally with increasing speed. In order to take account of this increased current, the distance of the rotor from the stator can also be suitably increased as the speed of the rotor increases. This increase may be used, for example, to achieve the desired heat output/speed profile for an adjusted rotor speed. In particular, the increase in the distance between the rotor and the stator may be initiated only in excess of a predetermined speed, in order thereby to limit the maximum output.

In another embodiment, the means for applying force to the rotor in the direction of the stator comprise a pneumatic piston, the force of which may be produced by negative pressure or excess pressure. If produced by negative pressure, the pneumatic piston may advantageously be combined with spring means, which likewise exert force on the rotor, and more specifically a diminishing force as the distance between the rotor and the stator increases. It is especially advantageous if the force characteristic of the said spring means is designed so that, at a constant rotor speed, an increasing negative pressure in the pneumatic piston moves the rotor closer to the stator.

As a safeguard against excessive heating of the cooling liquid, adjusting means may be provided alongside the cooling duct, which means are sensitive to the temperature of the cooling liquid and have the ability, when a predetermined temperature is reached, to act largely instantaneously on the rotor and to increase its distance from the stator to a value at which the heat generated in the stator is negligible. In this way, heating of the liquid flowing in the cooling duct in excess of a predetermined temperature value can be prevented, for example, where water is used as cooling medium, heating in excess of 100° C. can be prevented, thereby preventing evaporation at normal pressure.

The design of the cooling duct is critical with regard to the high output (with an order of magnitude of tens of kilowatts) that a heat generator according to the invention can develop. According to the invention, short flow paths are produced in the most active heating zone closest to the rotor by designing the stator with a first disc extending radially along the disc-shaped rotor and with a second disc situated along the said first disc and on the opposite side to the rotor, in order to form a radial gap between them. The cooling liquid can be made to flow radially through the said gap in that it is connected to openings around its outer and its inner circumference.

In a further embodiment of the heat generator, the rotor comprises two axially separated rotor discs and the stator two stator discs, which are arranged between the two rotor discs and adjacent to a respective one of these. In this case distance adjustments are produced in that the rotor discs are axially moveable away from one another and from the respective stator disc, which is fixed in relation to the axial movement.

On each rotor disc the permanently magnetised, disc-shaped rotor may have a plurality of permanent magnets, and may for the rest consist of a soft magnetic material, and each stator disc may consist of an electrically conductive material. As the rotor rotates, the magnetic field generated by the permanent magnets gives rise to currents in the stator discs, which currents in addition to generating heat in the stator discs in turn also give rise to magnetic fields that endeavour to counteract the magnetic field generated by the rotor magnets. The magnetic fields counteracting one another give rise to repelling forces, which act axially between the stator and the rotor, especially each pair of stator discs and each pair of rotor discs. These repelling forcing increase as the rotor speed increases and decrease as the distance between rotor and stator increases.

In the case with the two stator discs and two rotor discs, the cooling duct comprises two radial gaps, which are formed between each stator disc and a disc of magnetic material fixed alongside this. The said fixed disc of magnetic material is annular and closes the flux path for the magnetic field from the rotor through the stator. An attraction force thereby also occurs between each rotor disc and the associated fixed disc, which force endeavours to move the rotor discs towards the respective stator disc. This attraction force is largely dependent only on the distance.

Some examples of embodiments of a heat generator according to the invention will be described in more detail below with reference to the accompanying drawings.

The embodiment of a heat generator shown in FIGS. 1–5 of the drawings has a casing 1, which comprises two dish-shaped shields 2 and 3 and an intermediate peripheral ring 4, which are held together by means of six screw joints 5. A shaft 6 is supported centrally in the casing 1 by means of a bearing 7, 8 in each shield 2 and 3 respectively. Outside the casing 1, a belt pulley is fixed to the shaft 6, which inside the housing 1 supports a rotor 9.

The rotor 9 has a central hub 10 with six radially aligned spokes 11, at the outer ends of which two plane, annular rotor discs 12 and 13 are supported at an axial distance from one another. The rotor discs 12, 13 are guided for axial movement outwards and away from the position shown in FIGS. 2 and 3 by means of six guide pins 14, which are alternately fixed to the rotor disc 12 and the rotor disc 13. Six temperature-sensitive cylindrical means 15 are arranged axially between the rotor discs 12 and 13, which each consist of an outer ring and an inner ring fixed thereto, as can be seen from FIGS. 2 and 3. The cylindrical means 15 are of known type and increase their length by a predetermined value almost instantaneously when the ambient temperature exceeds a predetermined value.

Figure 1:
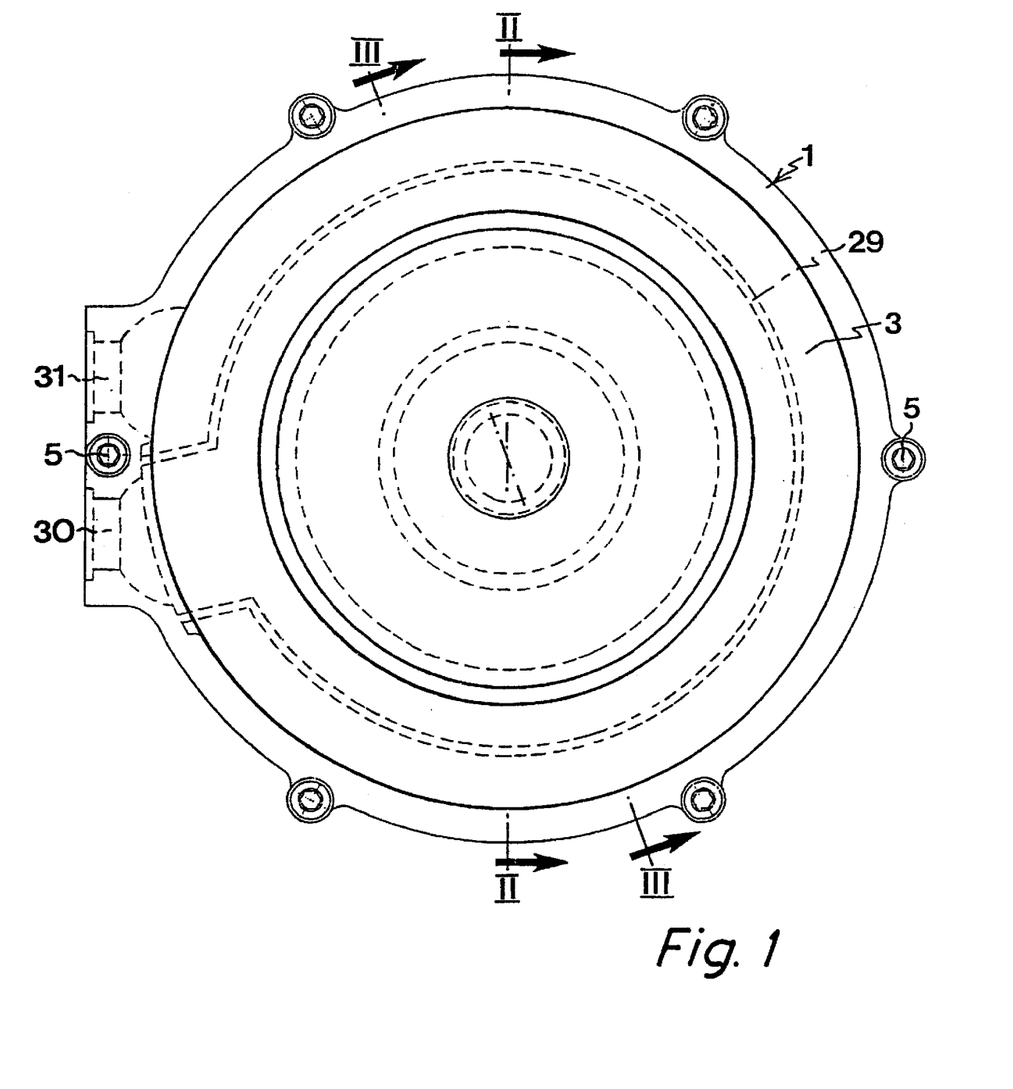
FIG. 1 is a side view of a first embodiment of a heat generator according to the present invention.
Figure 2:
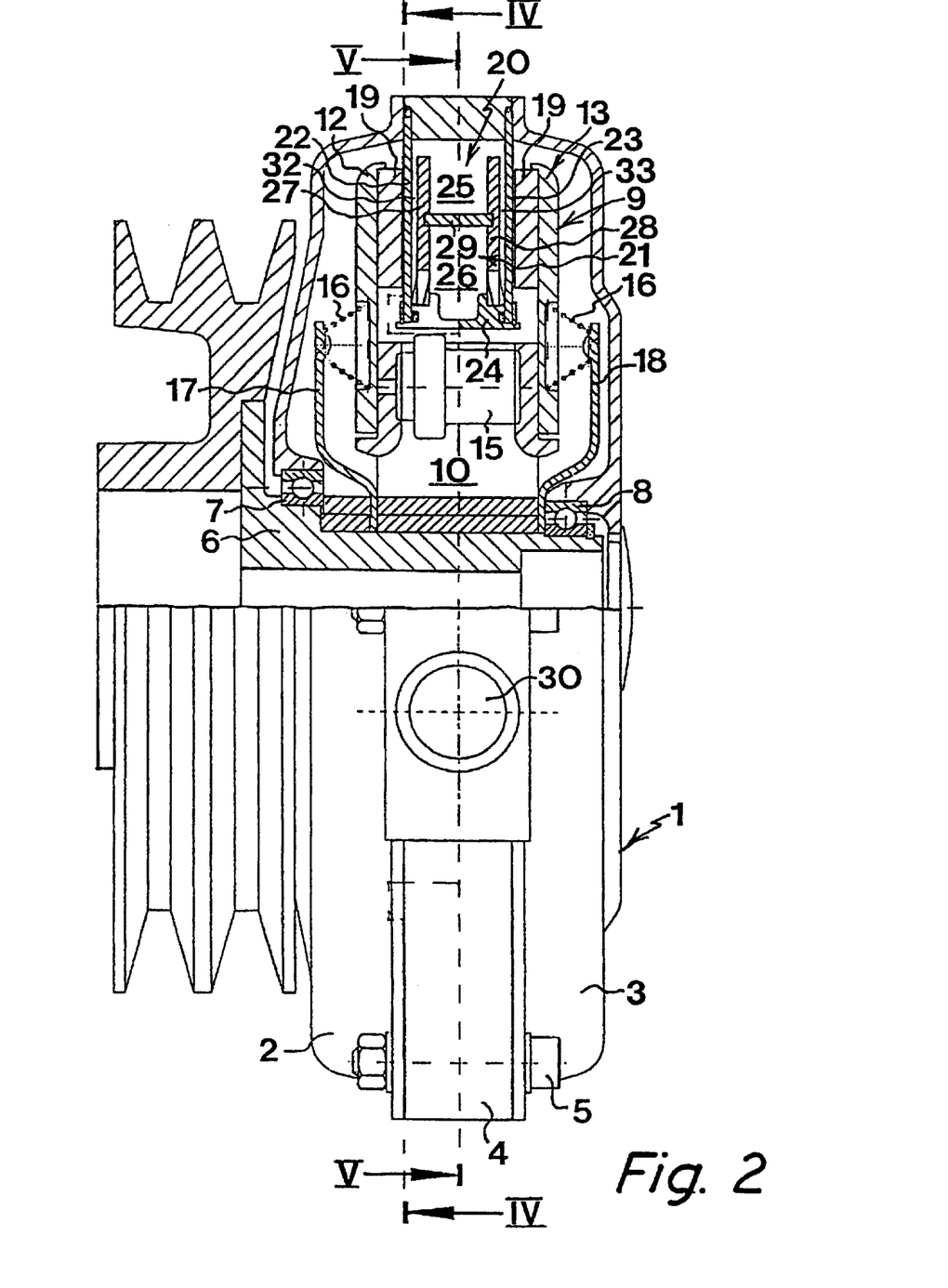
FIGS. 2 and 3 are axial, partial cross-sectional views taken along lines II—II and III—III respectively in FIG. 1.
Figure 3:
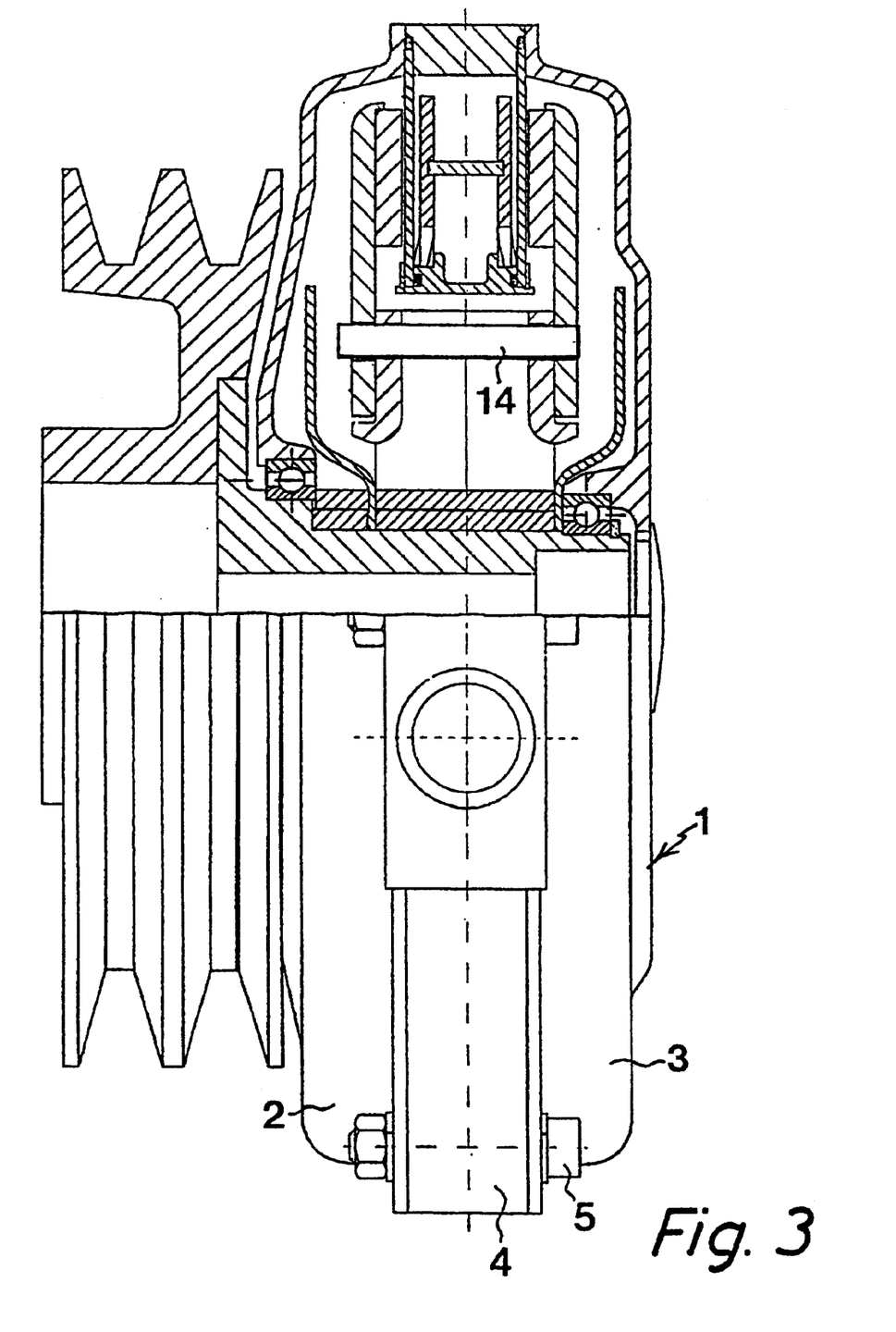
Figure 4:
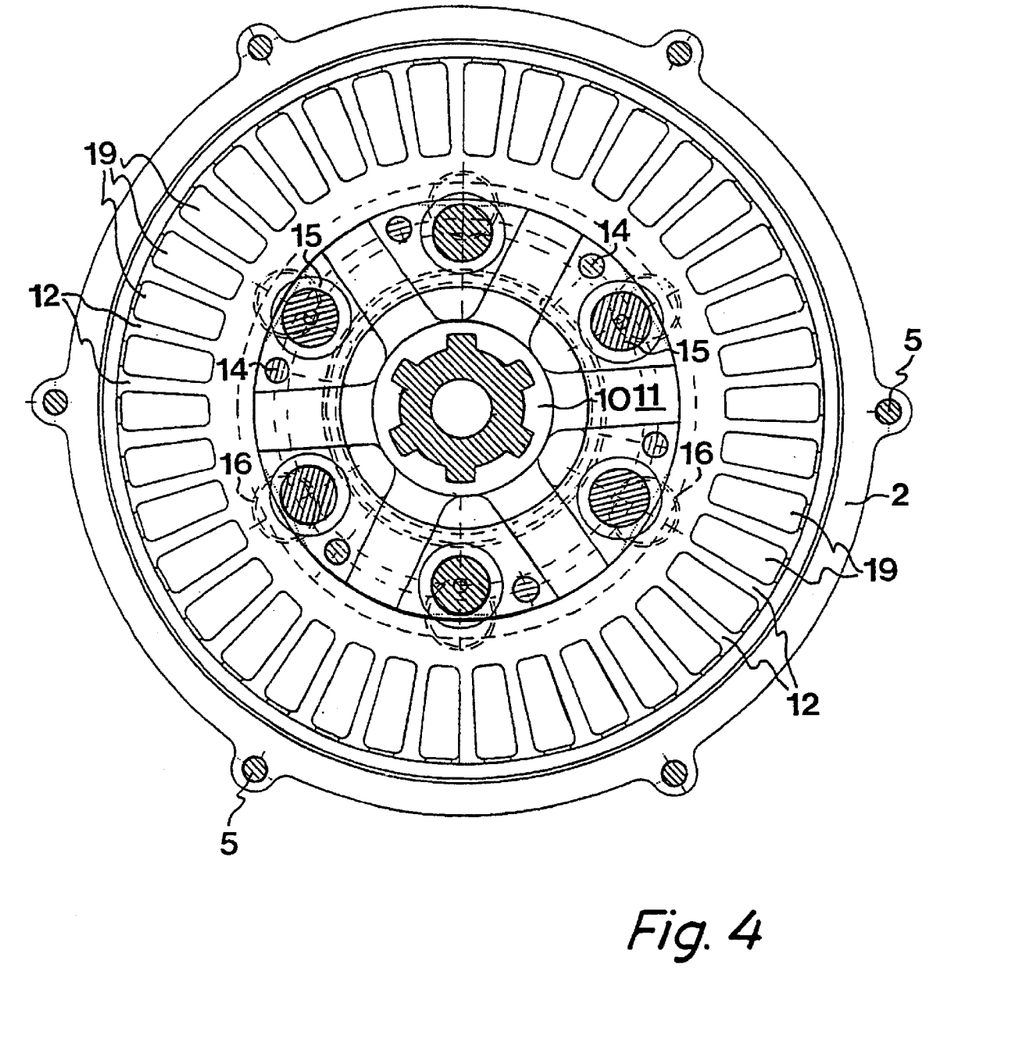
FIGS. 4 and 5 are radial cross-sectional views taken along lines IV—IV and V—V respectively in FIG. 2.
Figure 5:
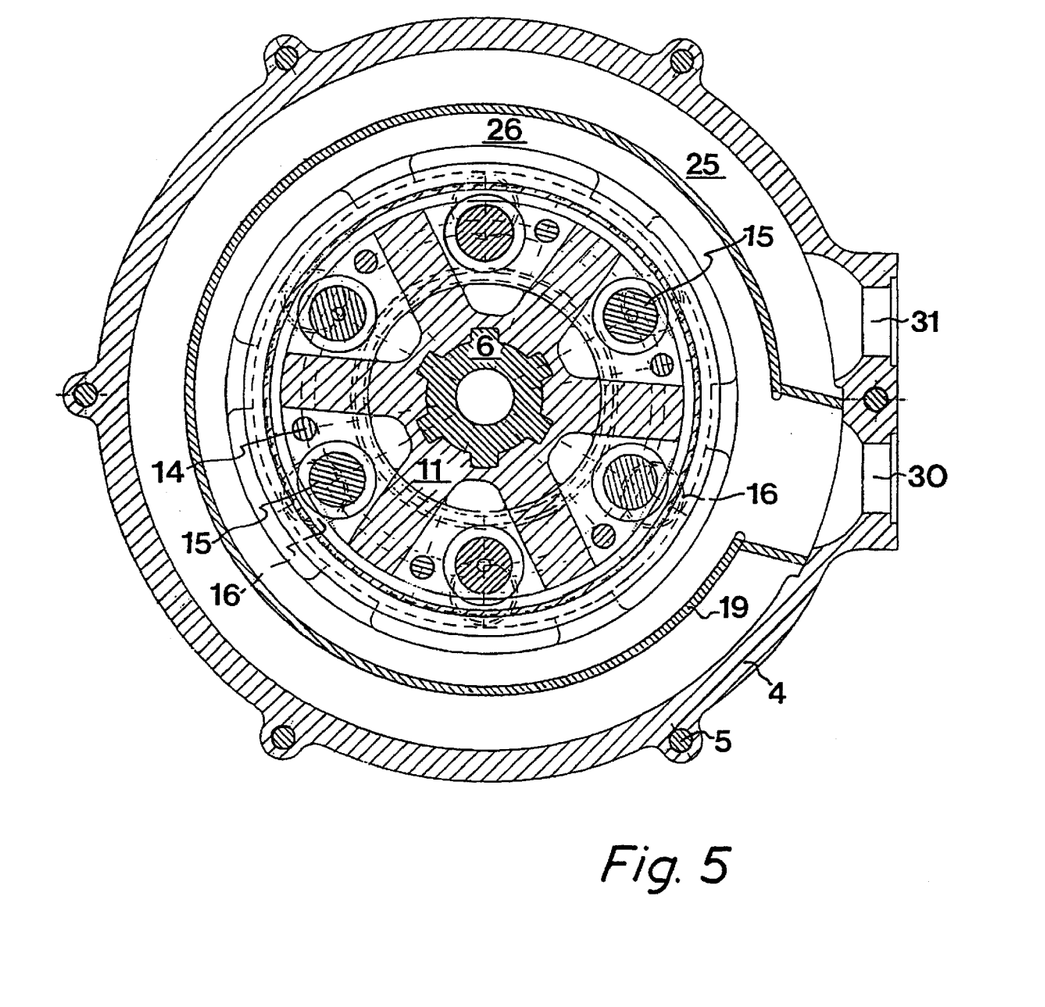

The rotor discs 12 and 13 are pressed towards the position shown in FIGS. 2 and 3, which is defined by their abutment against the outer ends of the spokes 11, by six bimetal springs 16 for each rotor disc. The springs 16 are each arranged between one of the rotor discs 12, 13 and one of two backing or counter discs 17, 18, situated axially outside these and fixed to the shaft 6.

On the outside a plurality of permanent magnets 19 is fitted on opposing sides of the rotor discs 12, 13, with axially aligned poles and with polarity alternating from magnet to magnet in the circumferential direction of the rotor discs.

A stator 20 and a cooling duct 21 are situated between the rotor discs 12, 13 and fixedly coupled to the casing 1. The stator 20 more specifically has two stator discs 22, 23 in the form of plane rings of electrically conductive, preferably non-magnetic material, for example copper, which at their peripherally outer edge are fixed into the casing 1, for example clamped between each of the shields 2, 3 and the peripheral ring 4, and at their peripherally inner edge are coupled to a casing 24, so that the stator discs 22, 23, the peripheral ring 4 and the casing 24. form an annular space between permanent magnets 19 of the rotor discs 12, 13, the said space constituting the cooling duct 21. The annular space is divided up into an outer duct 25 and an inner duct 26 by two plane rings 27, 28, which are fitted to the casing 24 and may also be said to form an integral part of the stator, and a substantially sleeve-shaped ring 29, which is connected between the plane rings 27 and 28 and extends around them and to a first opening 30 in the peripheral ring 4, which is thereby connected to the inner duct 26. A second opening 31 in the peripheral ring 4 is connected to the outer duct 25.

As will be seen from FIGS. 2 and 3, the plane rings 27, 28, which preferably consist of soft magnetic material, are arranged at a short axial distance from the respective stator discs 22, 23, so that two radial gaps 32, 33 are formed between them, which connect the outer duct 25 and the inner duct 26.

By means of the construction described above, a cooling medium, for example water, can be pumped in through the opening 30, in the circumferential direction into the inner duct 26, radially outwards via the gaps 32, 33, in the circumferential direction through the outer duct 25 to the second opening 31 and out through the same. The opposite direction of flow, that is from the opening 31 to the opening 30, is naturally also possible. With regard to this flow process, the cross-sectional area of the duct 26, that is to say its extent in the radial direction, may suitably diminish away from the opening 30, seen in the direction of flow, and the cross-sectional area of the duct 25 may accordingly increase to a corresponding degree towards the opening 31, seen in the direction of flow. The rate of flow in the longitudinal direction of each of the ducts 25, 26 can thus be made largely constant.

With the rotor 9 at a standstill, when the rotor discs 12, 13 are situated closest to one another, there is clearance between the permanent magnets 19 of the rotor 9 and each adjacent stator disc 22, 23. The rotor discs 12, 13 are then pressed into their position closest to each stator disc 22, 23 respectively, both by the compression springs 16 and by the attraction force between the permanent magnets 19 and the fixed discs constituted by the plane rings 27, 28.

When the rotor 9 is made to rotate, the magnetic fields generated by the permanent magnets 19 will generate electric currents in the stator discs 22, 23, thereby powerfully heating the latter. The heat generated in the stator discs 22, 23 is dissipated by the cooling liquid flowing through the gaps 32, 33.

The electric currents in the stator discs 22, 23 will also give rise to magnetic fields that generate a repelling force in relation to the magnetic fields of the permanent magnets 19, as a result of which the rotor. discs 12, 13 are forced to move axially away from the respective stator discs 22, 23 against the action of the compression springs 16 and the attraction force between the permanent magnets 19 of the rotor discs 12, 13 and the rings 27, 28.

By adjusting the spring characteristic of the compression springs 16 in relation to the characteristics for the repelling or attracting magnetic fields, a desired output/distance profile can be achieved.

Figure 6:
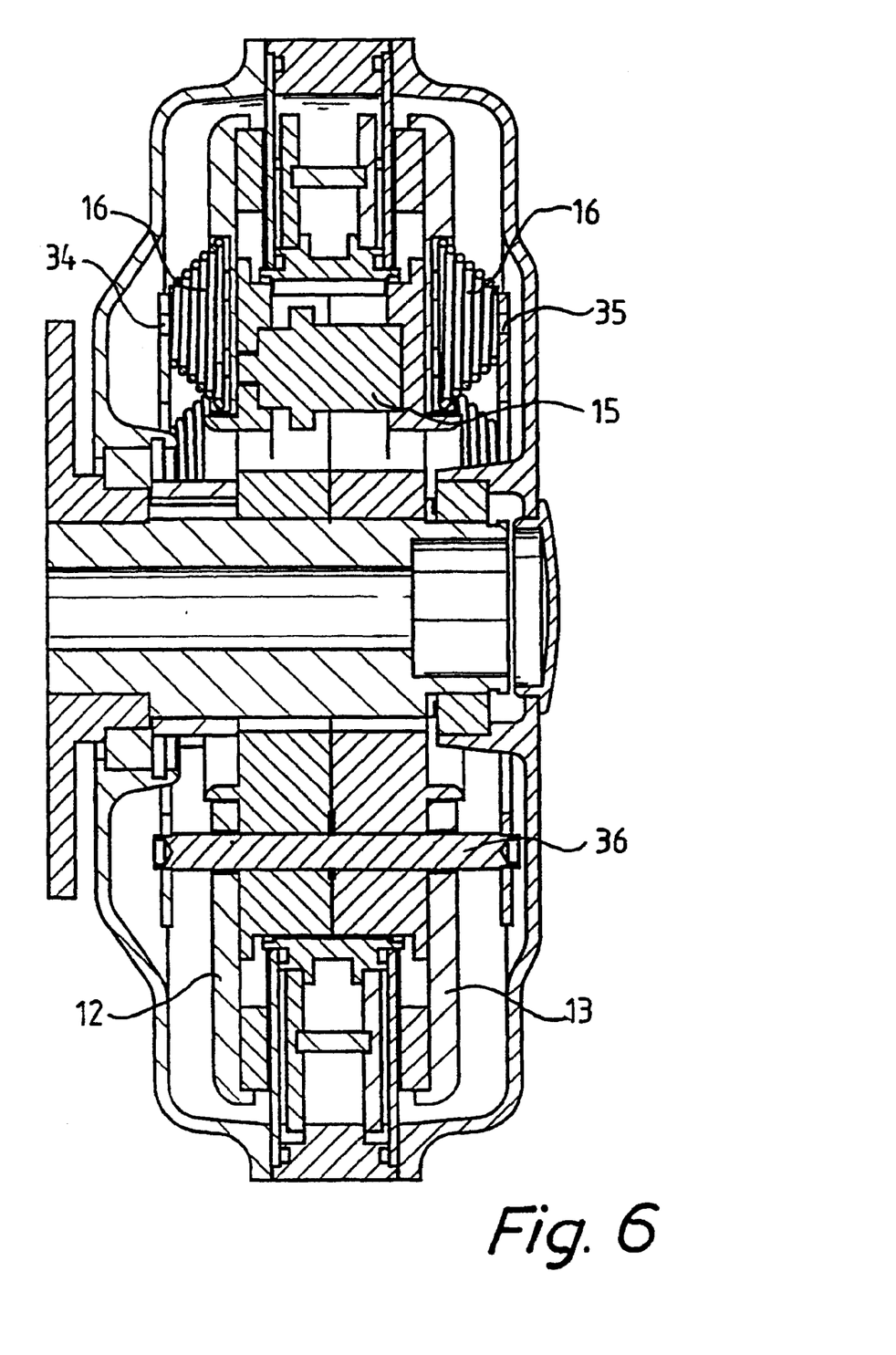
FIGS. 6 and 7 are axial cross-sectional views of a second and a third embodiment of a heat generator according to the invention.

The second embodiment shown in FIG. 6 differs from the first embodiment described above in that, as abutment means for the compression springs 16, two plane rings 34, 35 are used, which are fixedly connected to one another by means of pins 36, which extend through holes in the inner parts of the two rotor discs 12, 13. This provides a self-supporting and self-balancing abutment means for the compression springs 16.

Figure 7:
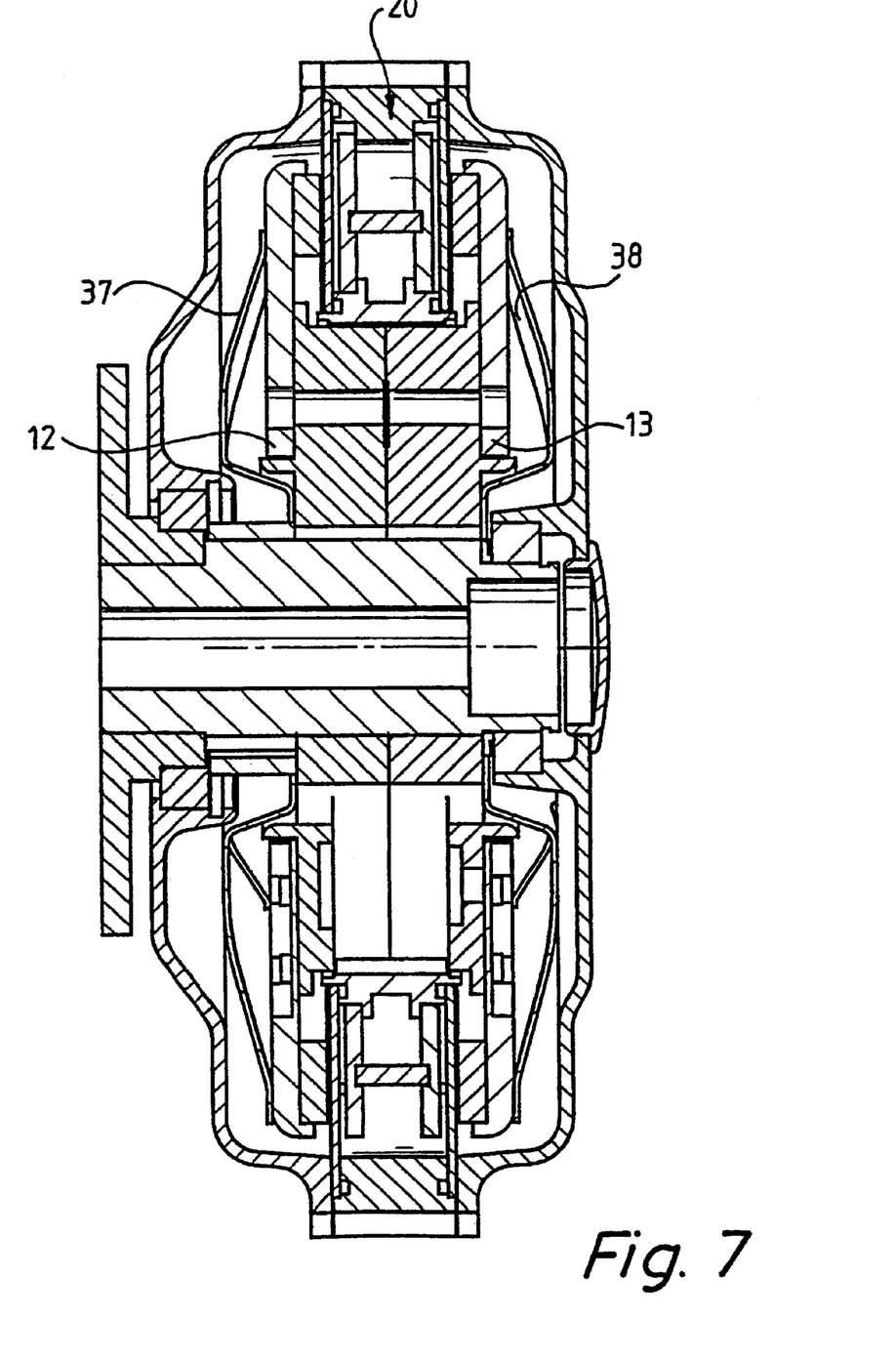

In the third embodiment illustrated in FIG. 7, the helical springs 16 are replaced by two star-shaped leaf springs 37, 38, which at their radially inner part are fixed to the sides of a respective one of the rotor discs 12, 13 remote from the stator 20. The leaf springs 37, 38 may advantageously consist of bimetal and in addition be pretensioned so as to exert a compressive force against the rotor in the position thereof shown in the figure. By making the leaf springs 37, 38 of bimetal, the pressure that they exert can be made to gradually diminish as the temperature increases, the distance of the rotor from the stator increasing and thereby reducing the heat developed in the stator, which consequently permits automatic control of the temperature of the liquid in. the cooling duct. Bimetal springs can also be made to switch instantaneously from one stable position to another stable position at a predetermined temperature. By utilising this method of operation, the leaf springs 37, 38 can be made to function as protection against excessively high liquid temperatures in the cooling duct.

Figure 8:
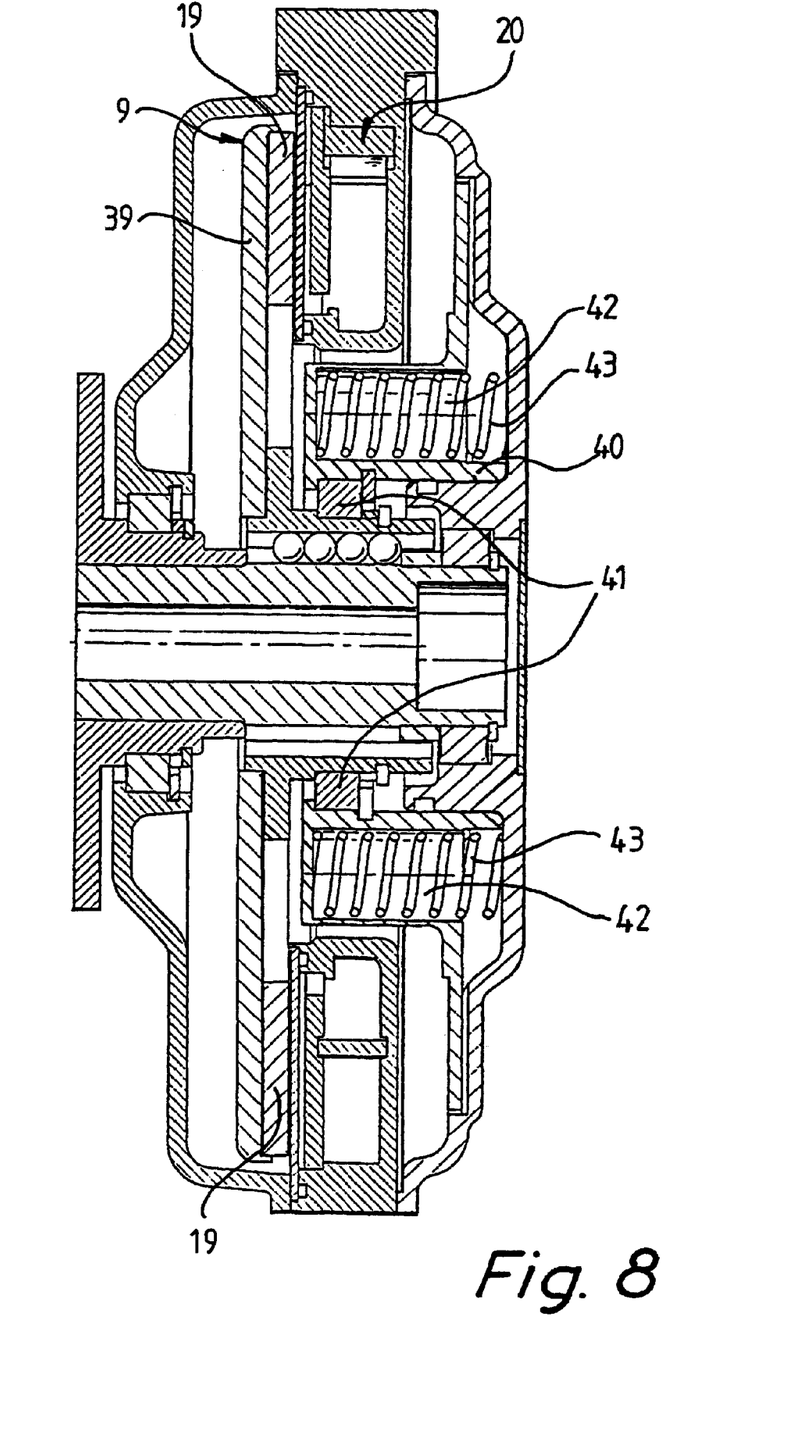
FIG. 8 is an axial cross-sectional view of a fourth embodiment of a heat generator according to the invention.
Figure 9:
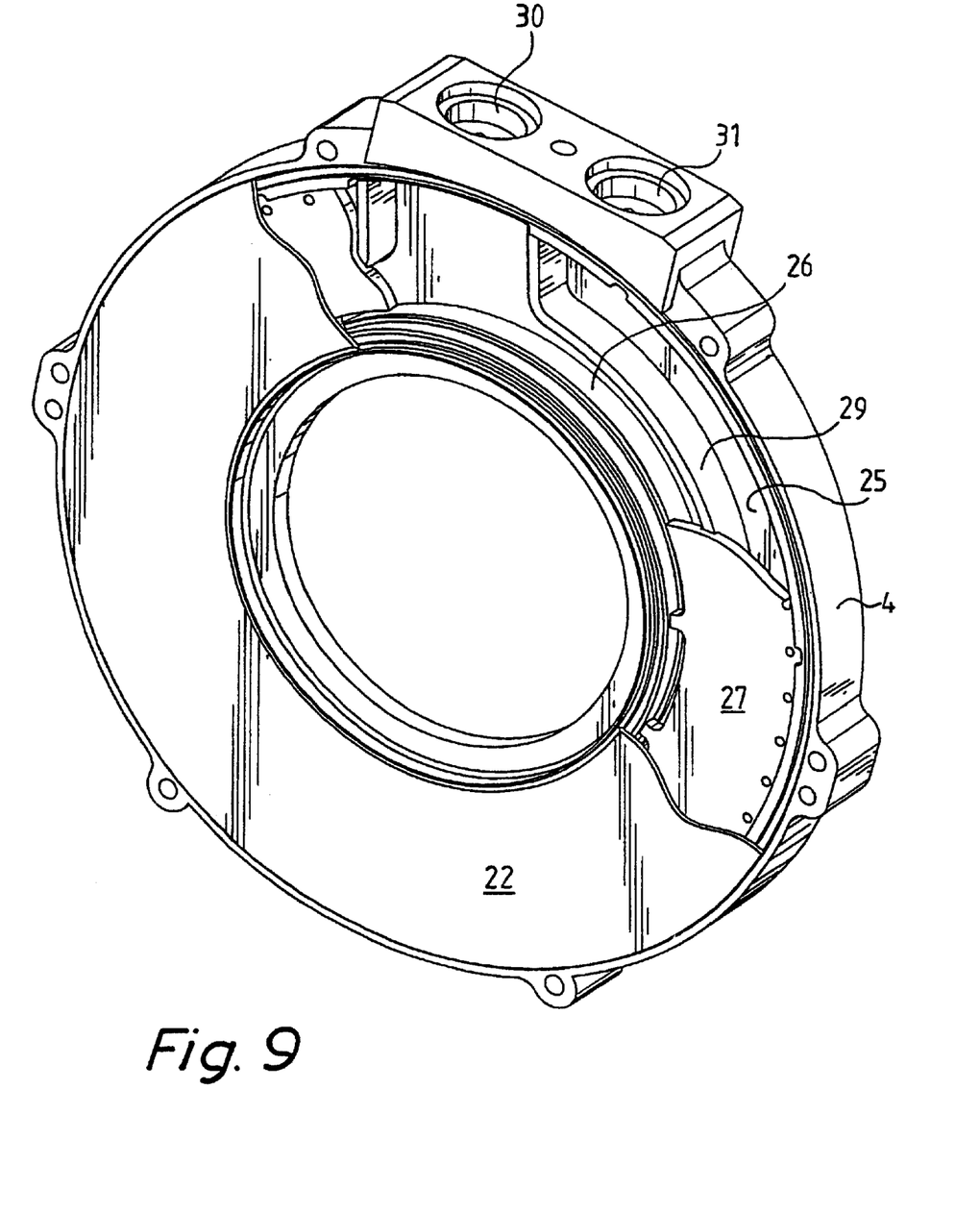
FIG. 9 is a perspective view of a stator forming part of the embodiment according to FIG. 8.

The embodiment of a heat generator according to the invention shown in FIGS. 8–9 differs from the preceding embodiments in that the rotor 9 has only one rotor disc 39. In this embodiment, a pneumatic piston 40, which is axially moveable together with the rotor 9 but does not rotate with the latter due to an intermediate ball bearing 41, is arranged in place of the second rotor disc in the other embodiments. The inner space 42 of the piston 40 is connected to a vacuum source (not shown), which can control the negative pressure in the piston 40.

A set 43 of springs, which may have varying hardness, is furthermore arranged inside the piston 40 and endeavours to move the piston 40 to the left in FIG. 9, that is to move the rotor 9 away from the stator 20. The spring characteristic of the spring set 43 is designed so that the difference between the forces acting on the rotor 9, which endeavour to move the rotor 9 in the direction away from the stator 20, and the attraction force acting between the rotor 9 and the stator 20 due to the permanent magnets 19 increases monotonously from the position of the rotor 9 furthest away from the stator 20 to its position closest to the stator 20. As a result of this design, the position of the rotor 9 can be easily and unambiguously controlled by means of the magnitude of the negative pressure in the pneumatic piston 40, which negative pressure thus acts on the piston 40 and hence the rotor 9 in the direction towards or away from the stator 20.

Figure 10:
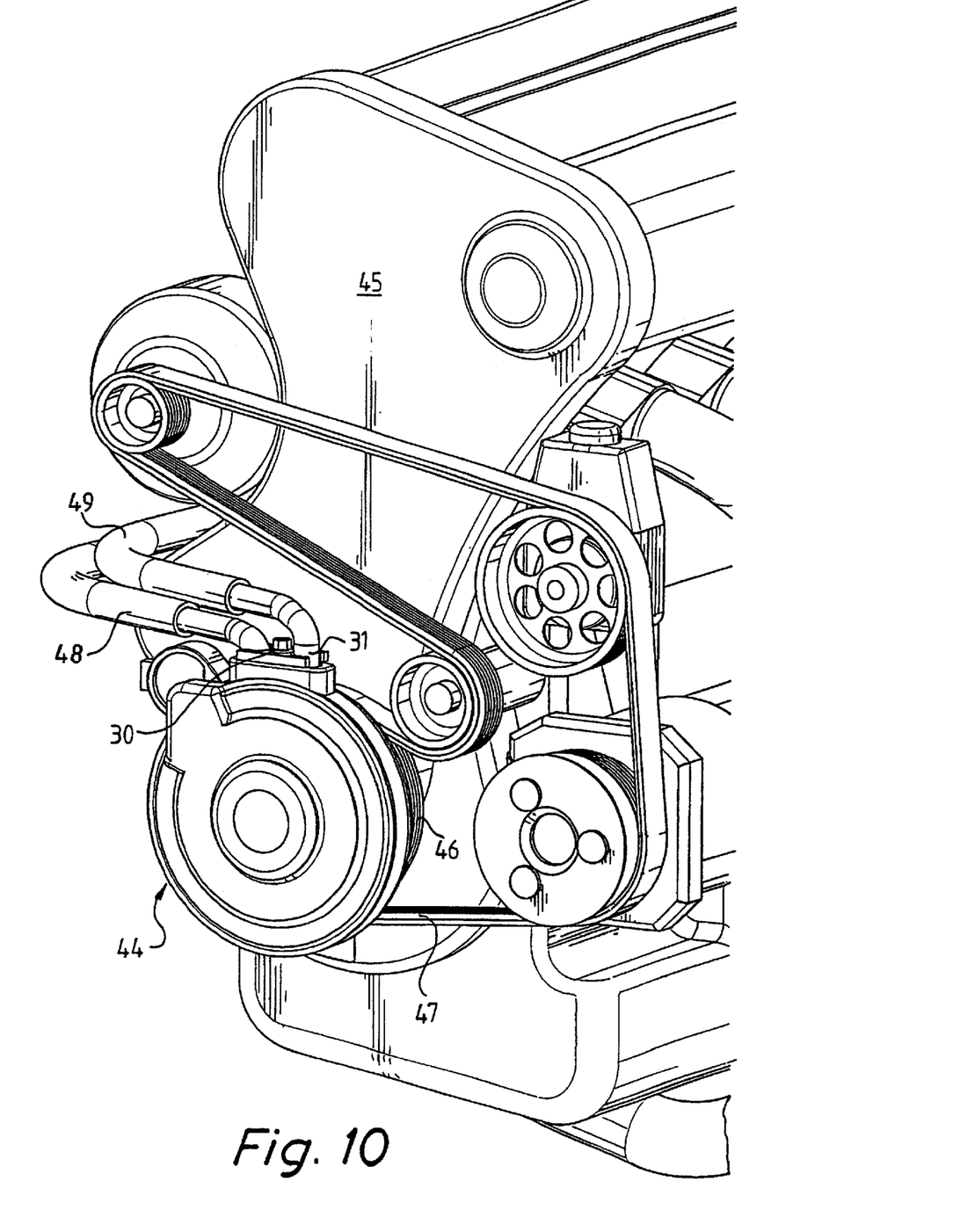
FIG. 10 is a perspective view and shows a heat generator according to the invention mounted on a crankshaft of a partially shown internal combustion engine for a motor vehicle.

FIG. 10 illustrates how compact a heat generator 44 according to the invention is in relation to a conventional internal combustion engine 45. The heat generator 44, the stator 20 of which is fixed to the internal combustion engine 45, may more specifically be coupled directly to the engine shaft by way of the usual pulley 46 for the transmission belt 47, which couples the engine shaft to control servo and generator, for example. The inlet and outlet, that is the openings 30, 31, of the heat generator are connected by way of hoses 48, 49 to the cooling system of the internal combustion engine 45.

The embodiment of a heat generator described above may obviously be modified in many respects, for example other means, such as electrically powered means, can also be used for applying force to the rotor in the direction of the stator. Such an embodiment is shown in the exploded view in FIG. 11. This embodiment of the heat generator is similar to that in FIGS. 8 and 9 but instead of the pneumatic piston 40 and the spring set 43 has two meshing cog wheels 50, 51 with bevelled cams 52 and cam grooves 53 respectively. The cog wheel 50 is supported so that it is displaceable only axially and acts on the axial position of the rotor 9, whilst the cog wheel 51 is supported so that it can only rotate, more specifically by means of an arm 54 which is fixedly connected to the cog wheel 51 and the rotational position of which can in turn be controlled, for example, by means of an electric motor 55 according to an override signal from the control electronics, which control the internal combustion engine, for limiting the heat output generated in the stator by positively turning the cog wheel 51 and thereby axially moving the cog wheel 50 and the rotor in relation to the stator, so that, for example, a position with a limited output can be achieved.

The cog wheel 50, 51 may naturally also form an override means for positive movement of the rotor to a desired output position.

Figure 11:
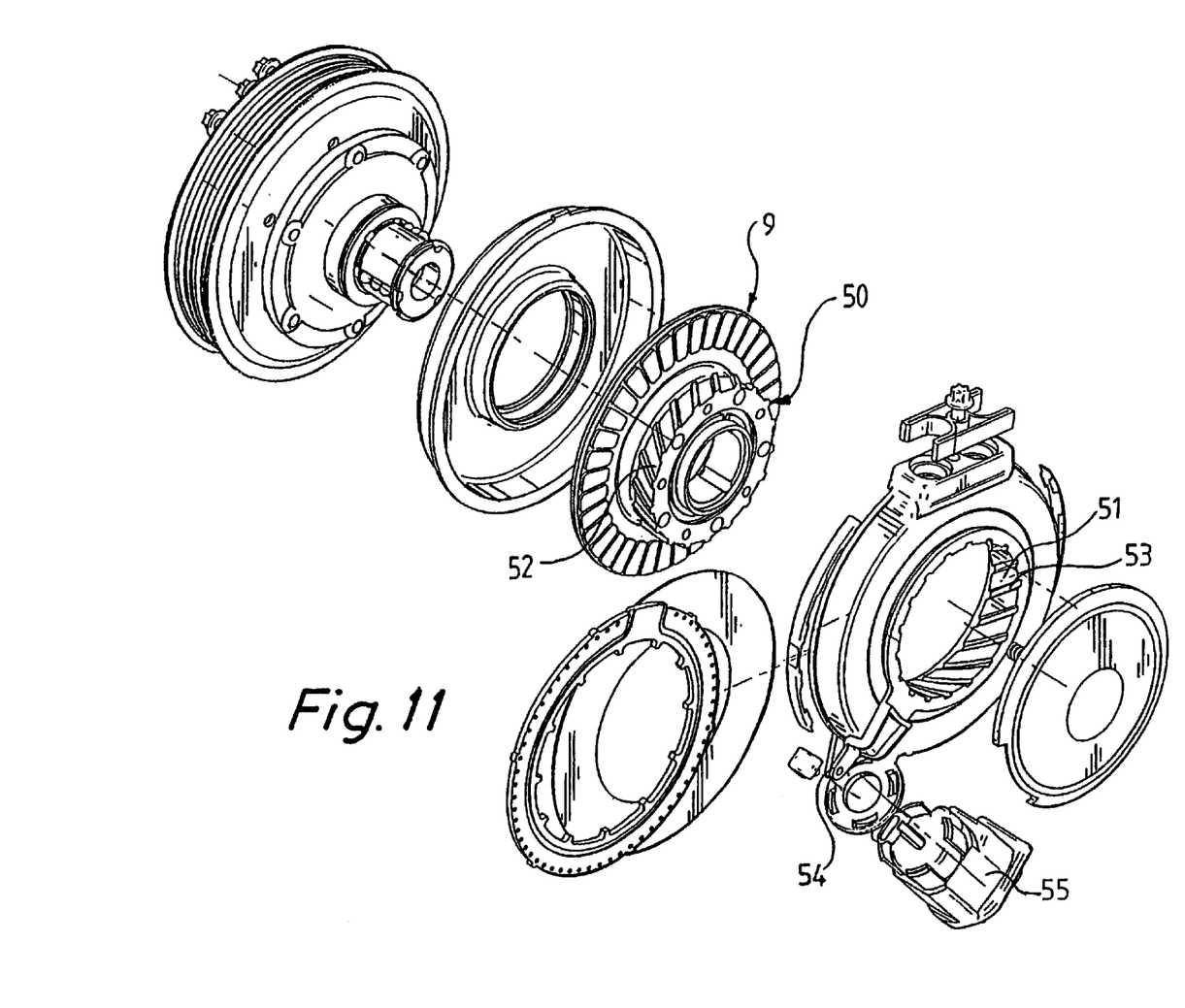
FIG. 11 is an exploded view of a fifth embodiment.

As a further alternative the cog wheel 51 may be made entirely stationary, that is to say axially immovable and also non-rotatable, and the arm 54 may be non-rotationally but axially movably connected to the cog wheel 50. The cog wheel, as in the embodiment in FIG. 11, is in turn axially moveable together with the rotor 9 and also rotatably supported in relation thereto. This alternative is in fact one of the preferred alternatives.

Figure 12:
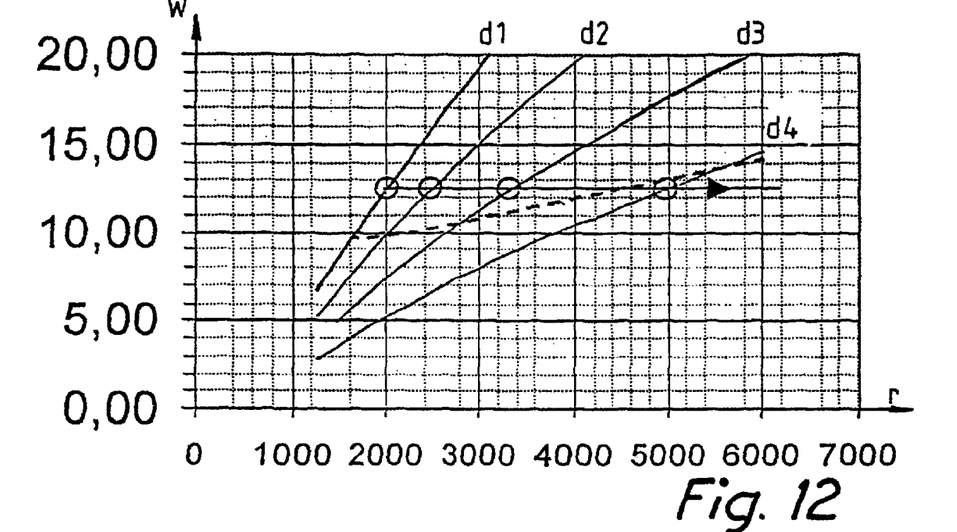
FIG. 12 is a diagram of the output developed as a function of the speed and distance in an embodiment of a heat generator according to the invention.

FIG. 12 shows a diagram, which schematically illustrates the power output W (kW) in a heat generator according to the invention as a function of the speed of rotation r (rpm) at various distances d (d1–d4, for example 0.4/0.8/1.3/1.9 mm) between stator and rotor. It will be seen that the power output W increases with increasing speed of rotation at a constant distance (e.g. d1) between rotor and stator, and that the rate of increase of the power output W is greater the smaller the distance d between stator and rotor. Conversely, the power output W diminishes with increasing distance d at a constant speed of rotation r. A desired output/speed profile can thus be achieved by varying the distance d according to the speed of rotation r.

Since the magnetic field strength varies substantially as the reciprocal of the square of the distance between the rotor and the stator, a very appreciable variation in output can be obtained by a relatively small variation of the axial distance between the rotor and the stator. This in turn means that the heat generator according to the invention can be made very compact.

Figure 13:
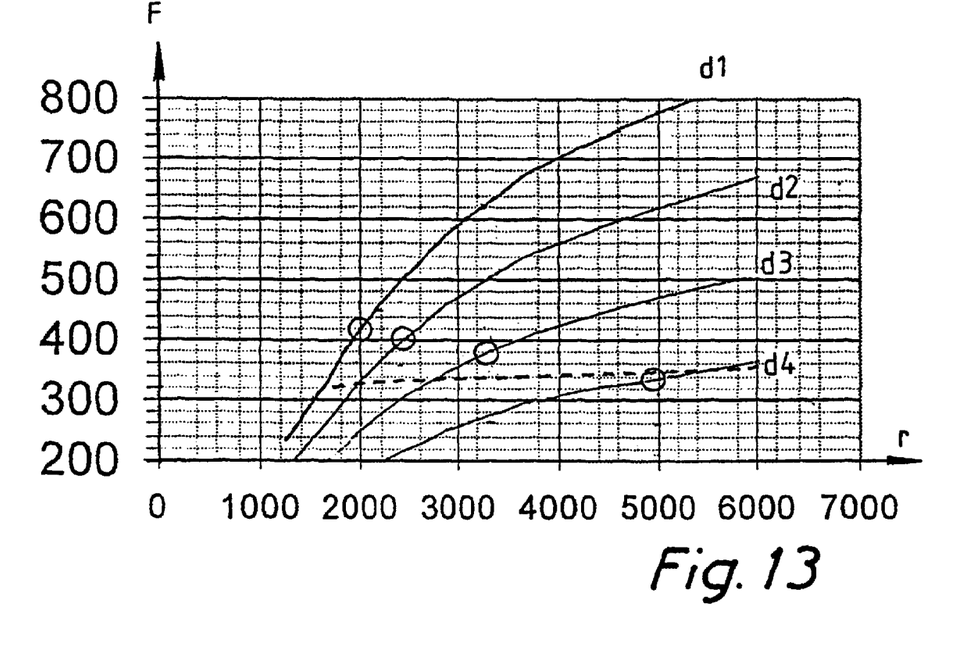
FIG. 13 is a diagram of repelling force as a function of the speed and distance in an embodiment of a heat generator according to the invention.

FIG. 13 shows a diagram, which schematically illustrates the repelling force F (N) in a heat generator according to the invention as a function of the speed of rotation r (rpm) at various distances d (for example d1–d4 according to the above) between stator and rotor. As described above, this repelling force is the result of the interaction between the magnetic fields of the permanent magnets and the magnetic field that is generated by the currents induced in the stator. It will be seen that the repelling force F increases with increasing speed of rotation at a constant distance (e.g. d1) between rotor and stator and that the rate of increase of the repelling force F is greater the smaller the distance d between stator and rotor. Conversely the repelling force diminishes with increasing distance d at a constant speed of rotation r.

In order to vary the distance d according to the speed of rotation r with the aim of achieving a desired output/speed profile, the repelling force is according to the invention suitably balanced by acting axially on the rotor in the direction of the stator with a variable force, which is thus directed counter to the repelling force F.

In FIG. 12, a line is drawn for a constantly power output of. 12.5 kW (developed irrespective of the speed of rotation) and the intersections of the line with the power output curves for the various distances d1–d4 are indicated by circles. The speed/distance intersections indicated by the circles are also inserted in FIG. 13.

It will be seen that the repelling force diminishes with increasing speed of rotation, when the power output is to be kept constant, which means that the force that is required in order to balance the repelling force will in this case also diminish correspondingly with increasing speed of rotation.

It will be appreciated that a number of further modifications of the embodiments of a heat generator described above, for example various combinations of various means for applying force to the rotor in the direction of the stator, are possible within the scope of the invention, as specified in the appended claims.

What is claimed is:

1. A heat generator for reducing emissions from motor vehicles, characterised by a permanently magnetised, disc-shaped rotor (9, 12, 13), a stator (20, 22, 23), which is axially separated from the rotor and in which the rotor induces electric currents as it rotates, which generate heat in the stator, a cooling duct (21) adjoining the stator for a flowing cooling liquid in order to dissipate the heat generated in the stator, the rotor (9, 12, 13) and the stator (20, 22, 23) being axially moveable in relation to one another in order to adjust the heat generated in the stator, and means (15, 16, 19, 27, 28, 37, 38, 40) for determining the heat output generated in the stator by acting axially on the rotor in the direction of the stator with a variable force against the action of a repelling force, which is generated by the currents induced in the stator, said means (15, 16, 19, 27, 28, 37, 38, 40) comprising a soft magnetic material (27, 28), which constitutes part of the stator, so that a magnetic attraction force acts between the permanently magnetised rotor (9) and the stator (29), and means (15, 16, 19, 27, 28, 37, 38, 40) for strengthening and/or weakening the magnetic attraction force for achieving a predetermined output/speed profile.

2. A heat generator according to claim 1, characterised in that the stator (20) comprises two metallic layers (22, 27), which define a narrow radial gap (32), which constitutes a part of the cooling duct (21) and is designed for a radial flow of the cooling liquid.

3. A heat generator according to claim 2, characterised in that the cooling duct (21) additionally comprises two annular spaces (25, 26) adjacent to the radial gap, which are designed for a circumferential flow of the cooling liquid.

4. A heat generator according to claim 3, characterized in that the repelling force generated in the stator (20) is dimensioned, by means of the magnetic material of the stator and its volume and distance from the rotor (9), at a predetermined speed of rotation, to move the rotor (9) away from the stator (20) against the action of the magnetic attraction force between them.

5. A heat generator according to claim 2, characterized in that the two metallic layers (22,27) one layer (22) nearest the rotor (9) comprises an electrically conductive, preferably non-magnetic material, and one layer (27) furthest away from the rotor (9) comprises a soft magnetic material.

6. A heat generator according to claim 1, characterized in that the means (15,16,19,27,28,37,38,40) acting axially on the rotor (9) comprise an override means (55) for positive movement of the rotor (9) to a desired output position.

7. A heat generator according to claim 1, characterized by adjusting means (15) sensitive to the temperature in the cooling duct (21) and having the capacity, on reaching a predetermined temperature, to increase the distance between the rotor (9,12,13) and the stator (20,22,23) largely instantaneously to a value at which the heat generated in the stator is negligible.

8. A heat generator according to claim 1, characterized in that the means (15,16,19,27,28,37,38,40) acting axially on the rotor (9) are controlled by an override signal from control electronics, which control the internal combustion engine (45), in order to limit the heat output generated in the stator (20) by positively moving the rotor (9) in relation to the stator and achieve a position with limited output.

9. A heat generator according to claim 1, characterized in that the stator (20) comprises a first disc (22) extending radially along the disc-shaped rotor (9), and a second disc (27) situated radially along the first stator disc and on the opposite side to the rotor in order to form a radial gap (32), which has trimming openings around its outer and its inner circumference in order to permit an evenly distributed flow of the flowing liquid through the gap (32) and dissipation of the heat generated in the stator (20).

10. A heat generator according to claim 9, characterised by an outer annular space (25), which connects to the openings at the outer circumference of the gap (32), and an inner annular space (26), which connects to the openings at the inner circumference of the gap (32), which annular spaces constitute collecting lines for the liquid flowing to and from the gap (32) respectively.

11. A heat generator according to claim 9, characterized in that the openings are formed in the second disc (27).

12. A heat generator according to claim 1, characterized in that the rotor (9,12,13) comprises two axially separated rotor discs (12,13) and that the stator (20,22,23) comprises two stator discs (22,23) arranged between the two rotor discs and adjacent to a respective one of these.

13. A heat generator according to claim 12, characterised in that the rotor discs (12, 13) are axially moveable away from one another and from the respective stator discs (22, 23).

14. A heat generator according to claim 13, characterised in that each rotor disc (12, 13) has a plurality of permanent magnets (19), that each stator disc (22, 23) comprises an electrically conductive, preferably non-magnetic material, and that two further discs (27, 28) of magnetic material are arranged adjacent to a respective on of the stator discs (22, 23) and on the opposite side to the respective rotor discs (12, 13).

15. A heat generator according to claim 1, characterized in that the cooling duct (21) is arranged to be connected to the cooling system of an internal combustion engine (45), which is coupled so as to drive the rotor (9) and the emission values of which are intended to be improved by this arrangement.

16. A heat generator according to claim 1, characterized in that it constitutes an integral part of the system of temperature and emission control of an internal combustion engine, both mechanically, thermally and in terms of control engineering.

17. A heat generator for reducing emissions from motor vehicles, characterised by a permanently magnetised, disc-shaped rotor (9, 12, 13), a stator (20, 22, 23), which is axially separated from the rotor and in which the rotor induces electric currents as it rotates, which generate heat in the stator, the rotor and the stator being axially moveable in relation to one another in order to adjust the heat generated in the stator, and a cooling duct (21) adjoining the stator and intended for a flowing cooling liquid for dissipation of the heat generated in the stator, which cooling duct comprises a narrow radial gap (32) adjoining the stator and two annular spaces (25, 26), each connected to a radial side of the radial gap, which spaces are designed for mutually opposing cooling liquid flows in the circumferential direction of the cooling liquid, which thus flows from one annular space (26) to the gap (32) and from this to the other annular space (25).

* * * * *